United States Patent [19]

Yao

[11] Patent Number: 4,671,620

[45] Date of Patent: Jun. 9, 1987

[54] PHASED-ARRAY ACOUSTO-OPTIC BRAGG CELL

[75] Inventor: Shi-Kay Yao, Anaheim, Calif.

[73] Assignee: TRW Inc., Redondo Beach, Calif.

[21] Appl. No.: 735,027

[22] Filed: May 17, 1985

[51] Int. Cl.⁴ .............................................. G02F 1/11
[52] U.S. Cl. .................................................... 350/358
[58] Field of Search ........................................ 350/358

[56] References Cited

U.S. PATENT DOCUMENTS 3,493,759  2/1970  Adler ................... 350/358
4,381,887  5/1983  Guerin et al. .......... 350/358

Primary Examiner—Bruce Y. Arnold
Attorney, Agent, or Firm—Noel F. Heal; Robert J. Stern

[57] ABSTRACT

An acoustical phased array having improved interaction efficiency and efficiency-bandwidth product. The array includes a body of acousto-optical material having one face grooved to form a number of sets of plane parallel surfaces, each set having n different height levels, where n is at least two. An electro-acoustic transducer is affixed to each surface and high-frequency signals are applied to the respective sets of transducers, each signal being phase-displaced by the same amount with respect to the signal applied to an adjacent set. The incremental height difference is 1/n of the phase difference between signals applied to adjacent sets, expressed in wavelengths, and this results in elimination of one lobe of what would otherwise be a twin-lobe far-field acoustic radiation pattern, and an approximate doubling in interaction efficiency.

8 Claims, 4 Drawing Figures

PHASED-ARRAY ACOUSTO-OPTIC BRAGG CELL

BACKGROUND OF THE INVENTION

This invention relates generally to acousto-optical devices, and more particularly, to devices known as Bragg cells, for the modulation of a light beam with an acoustic signal at radio frequencies. Acousto-optical devices have been increasingly used for the modulation of light beams in such applications as communications, electro-optical instruments, and microwave as well as sensor signal processing.

Basically, an electrical radio-frequency (rf) signal is applied to one or more electro-acoustic transducers and converted to an rf acoustical energy beam. Interaction of the acoustical beam with a light beam can be used to deflect or otherwise modulate the light beam. The theory of acoustooptical modulation has been known for some years. A review of devices employing acousto-optical principles may be found in a paper entitled "Review of Acousto-optical Deflection and Modulation Devices," by E.I. Gordon, Proceedings of the IEEE, Vol. 54, No. 10, pp. 1391-1401, October, 1966.

In general, a design goal for these acoustooptical devices is to maximize both the bandwidth and the interaction efficiency, which is the degree of modulation that can be achieved as a function of the input rf power to the device. In other words, the goal is to achieve the greatest bandwidth with the smallest power requirement. Unfortunately, however, device power consumption is proportional to the square of the bandwidth.

It is known that the product of the acousto-optical interaction efficiency and the device bandwidth can be increased by employing a phased array for the generation of the acoustic signals. In a planar phased array, multiple electro-acoustical transducers are spaced uniformly across a planar surface, and are energized by signals that are phase-displaced with respect to each other. For example each transducer may be energized by a signal that is displaced in phase by an angle $\phi$ with respect to an adjacent transducer. In other words the relative phase angles for successive transducers are 0, $\phi$, 2$\phi$, 3$\phi$, and so forth. For convenience, it is preferable to make the phase difference $\phi$ equal to 180°. In the planar phased array, a 180° phase shift between elements produces two sets of wavefronts, which result in a far-field radiation pattern with two spaced lobes. Since only one of the lobes of the far-field pattern can be usefully employed in interaction with an optical beam, at least half of the acoustical power is wasted in this arrangement. Planar arrays of this general type are discussed in a paper by A. Korpel et al. in the Proceedings of the IEEE, Vol. 54, p. 1429, 1966.

In a paper entitled "Two Hundred MHz Bandwidth Step-Array Acousto Optic Beam Deflector," by S. K. Yao et al., presented at the SPIE Symposium on Optical, Electro-Optical, Laser and Photographic Technology, August, 1976, the authors described a different type of phased array structure, in which the individual transducer elements are formed in a blazed grating, having a generally sawtooth profile. Even with phase differences of 180° applied to the transducer elements, the resulting far-field pattern contains only a single lobe, and there is an accompanying improvement in efficiency.

The technique for constructing the blazed grating required that transducers be formed on a wedge-shaped piece of material acoustically identical with a body of acoustic material with which they would be used. Then the wedge-shaped piece is sliced into a plurality of wedge-shaped elements, which are then bonded to the body of material in a linear array, thereby forming the sawtooth profile. This process must be performed with extreme care and skill if the resulting array is to have the requisite precision. For microwave frequencies (above 300 MHz), it is virtually impossible to fabricate a grating using this technique, and microwave Bragg cells have had to rely on planar phased arrays, with their inherent inefficiency resulting from the generation of two acoustic beams.

Accordingly, prior to this invention acousto-optic Bragg cells operating with a one gigahertz or greater bandwidth suffered from a finite and relatively low efficiency-bandwidth product. A large rf power is required even to provide an efficiency of a few percent. For linear amplifier responses, an even larger power supply is needed. Since size, weight and power consumption are important factors in the design of Bragg cells for many applications, including space and avionics applications, there is a critical need for a Bragg cell capable of microwave operation and having a reduced rf power requirement. The present invention satisfies this need.

SUMMARY OF THE INVENTION

The present invention resides in a phased acoustical array having plane parallel surfaces, but in which one of two acoustic beams is eliminated and rf power is used with correspondingly higher efficiency. Briefly, and in general terms, the structure of the invention comprises a body of acousto-optical material having one face grooved to form a plurality of sets of plane parallel surfaces having n different height levels, where n is at least two, there being n surfaces in each set, ranging in height from lowest to highest, and a plurality of electro-acoustic transducers affixed one to each of the surfaces. The structure also includes means for applying a plurality of high-frequency signals to the transducers affixed to respective sets of surfaces, each of the signals having the same phase difference with respect to the signal applied to an adjacent set of transducers, and each signal being applied in parallel to all of the transducers in a set. The incremental height difference between adjacent surfaces in the same set is selected to be equivalent to one nth (1/n) of the phase difference between sets expressed in wavelengths. If the phase difference is $\phi$°, the incremental height is $\phi/360°$ wavelengths.

In simple terms, the surfaces in each set are arranged in a staircase fashion, ranging from the lowest to the highest, with the next set beginning with the lowest surface again, and so forth. The invention is particularly concerned with the case in which the signals applied to the sets of transducers differ in phase by 180°; or one half-wavelength. Thus the incremental height between surfaces in the same set is $\frac{1}{2}$n of a wavelength. An identical signal is applied to the first, third and other odd-numbered sets of transducers, while a signal with a phase difference of 180° is applied to the second, fourth and other even-numbered sets. Unlike the planar phased array of the prior art to which similarly spaced signals are applied, the structure of the invention produces a single acoustic beam and a single-lobed far-field radiation pattern, thereby reducing the amount of power that must be applied to the acoustic transducers for achieving certain acousto-optic diffraction efficiency.

In the illustrative embodiment of the invention, n is two, i.e. there are just two surface heights in the structure, and the transducers are connected electrically in sets of two each. Other values for n are, of course, also within the scope of the invention.

It will be appreciated that the present invention represents a significant advance in the field of acousto-optical Bragg cells. In particular, the invention provides a novel structure for producing a single-lobe far-field pattern from a phased array of acoustic transducers, while employing easily fabricated plane-parallel surfaces for mounting the transducers. Other aspects and advantages of the invention will become apparent from the following more detailed description, taken in conjunction with the accompanying drawings.

DESCRIPTION OF THE PREFERRED EMBODIMENT

Figure 1A:
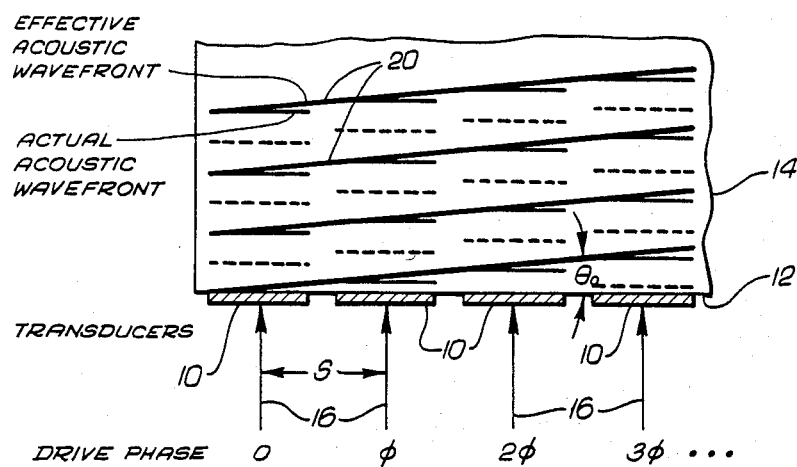
FIG. 1a is a diagrammatic view of a planar phased array of acoustic transducers of the prior art, showing the formation of two sets of wavefronts.

As shown in the drawings for purposes of illustration, the present invention is concerned with phased arrays of electro-acoustic transducers, as employed in acousto-optic devices known as Bragg cells. In a Bragg cell, acoustic energy interacts with a light beam and either deflects or modulates the light beam in some manner. There are a variety of applications for such devices, including RF spectrum analyzers, optical signal processors, laser beam modulators, and acoustic beam-steering devices.

In most applications, a measure of performance is the product of the bandwidth the device is capable of handling and the efficiency of interaction between the acoustic and light beams. The interaction efficiency expresses the degree of interaction as a fraction of the input power, which is at radio frequencies. It is known that the use of planar phased arrays for the generation of the acoustic energy results in an increased interaction efficiency. However, as will now be further explained, the planar acoustic array has an inherent efficiency limitation.

Figure 1B:
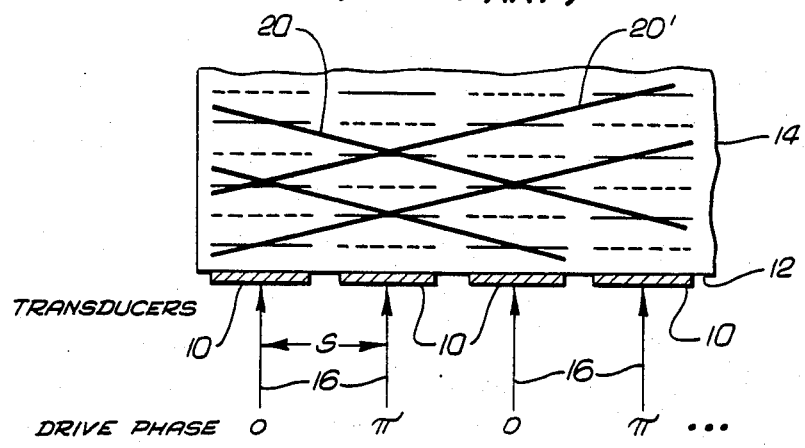
FIG. 1b is a view similar to FIG. 1a, in which the plane difference between signals applied to adjacent transducers is 180°.

FIGS. 1a and 1b show a portion of a planar acoustic array, including a plurality of electro-acoustic transducers, indicated by reference numeral 10, mounted on a planar surface 12 of a body 14 of acousto-optical material. The transducers 10 are strips of a conductive metal plated or otherwise deposited on the surface of a layer of piezoelectric dielectric film which is deposited on the surface 12. Radio-frequency (rf) signals are applied to the transducers 10, as indicated by the lines 16. The acoustic wave emanating from each of the transducers 10 are indicated by a series of parallel lines, which are alternately solid lines and broken lines. The spacing between any two successive solid lines or any two successive broken lines is equivalent to one wavelength, while the spacing between any two adjacent lines is one half- wavelength.

In FIG. 1a, the phase of the signal applied to the first transducer is indicated as zero, and the phases of the signal applied to the second, third and successive transducers are indicated as $\phi$, $2\phi$, $3\phi$ and so forth. The wavefronts emanating from the individual transducers are shown as indicating a phase difference consistent with this scheme. It will be appreciated, of course, that the wavefronts and their phase differences are shown diagrammatically, and not drawn to scale for the small wavelengths contemplated for the device of the invention.

It will be observed that the individual wavefronts from adjacent transducers may be easily combined, as indicated by the lines 20 in FIG. 1a, giving rise to a set of composite wavefronts inclined at an angle to the transducer array. Moreover, this angle will change if the frequency of the applied rf signals is changed, permitting steering of the composite acoustic beam emanating from the array.

Figure 2:
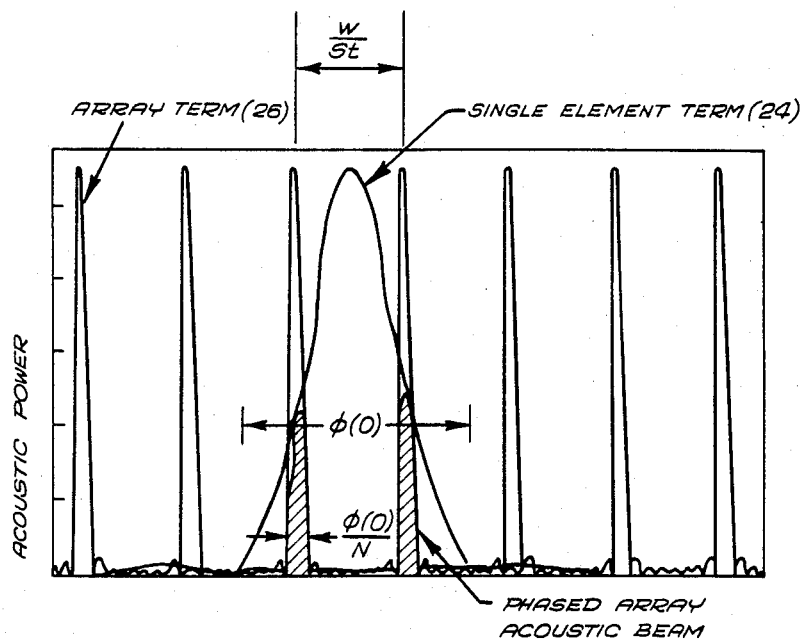
FIG. 2 is a graph showing the far-field acoustic power distribution of the planar array of FIG. 1b.

The use of costly phase shifting devices required for the array of FIG. 1a can be avoided if the phase difference $\phi$ is selected to be 180°. Since only two different signals are then needed, one being the inverse of the other, no phase-shifting circuitry is required. This is the arrangement illustrated in FIG. 1b, in which identical reference numerals have been used. The critical difference between the versions of FIG. 1a and FIG. 1b is that the individual wavefronts align themselves in a symmetrical manner if the phase difference is 180°. Two equally valid sets of composite wavefronts, indicated at 20 and 20', are formed in the FIG. 1b version. Intuitively, this can be seen as giving rise to twin lobes in the far-field power distribution pattern, and this is confirmed by the graphical representation of FIG. 2, which plots acoustical power as a function of wave propagation angle.

The far-field acoustic power distribution can be considered as the product of a single-element term 24 and an array term 26. The single-element term 24 is a single-lobed distribution curve having an angular width approximately proportional to wavelength and inversely proportional to the width of each transducer 10. The array term 26 consists of a plurality of narrow spikes of distribution, spaced apart by an angular distance approximately proportional to wavelength and inversely proportional to the periodic spacing between array elements. The actual distribution of acoustic power is indicated by the shaded area in the figure, which is the product of the single-element and array terms. This pattern is a twin-lobed one, corresponding to the two sets of wavefronts generated at the transducers.

It is not practical to provide for interaction between a light beam and two lobes of acoustic energy, which basically constitute two separate acoustic beams. Therefore, one of the lobes is literally wasted, and the efficiency of the device is half of what it would be if one lobe could be eliminated. As discussed in the foregoing background section, a technique for achieving this end, using a non-planar array of transducers, has been proposed for use at a frequency of 200 MHz However, this approach is totally impractical for microwave frequencies (above 300 MHz).

In accordance with the invention, a new acoustic phase array provides only a single-lobed far-field pattern, using transducers arrayed on a plurality of plane-parallel surfaces. As shown in the exemplary embodiment of FIG. 3, a body 30 of acousto-optical material is grooved to form surfaces, indicated by 32.1, 32.2, 32.3, and so forth, of varying heights, but each surface is planar and the surfaces are parallel with each other. The surfaces are grouped in sets of two, each set having a low surface and a high surface. Each surface has a transducer 34 formed on it, and the transducers in each set are connected in parallel. Thus the transducers on surfaces 32.1 and 32.2 are connected in parallel, as are the transducers on surfaces 32.3. and 32.4, and so forth. The height difference from one surface to the next is equivalent to a quarter wavelength. Hence the wavefronts emanating from the first two surfaces 32.1 and 32.2 differ in phase by a quarter-wavelength, i.e. by 90°. The signal applied to the next pair of transducers, on surfaces 32.3 and 32.4, differs in phase by 180° with respect to the signal applied to the first pair of transducers. Therefore, the phase difference between the second and third transducers, on surfaces 32.2 and 32.3, is also a quarter-wavelength or 90°. It will be observed that the same phase difference is found between each pair of adjacent transducers in the array.

It will also be observed that the individual wavefronts combine easily into a composite wavefront, as indicated at 38, but that combination into a second wavefront, indicated by the broken line 40, is virtually impossible. The arrangement of the invention has, therefore, eliminated one of the twin lobes associated with the planar version of the phased array, and has consequently improved the interaction efficiency by a factor of two. One may also consider that the invention achieves the effect of a planar array having 90° phase shifts between adjacent transducers.

It will be understood that the invention is not limited to a structure in which each input signal is applied to a pair of transducers. The same principle applies if there are three surface levels in each set, each set being configured in a staircase fashion. In general, if there are n surface levels the incremental level difference from one surface to the next, within the same set of surfaces, is $\frac{1}{2}n$ of a wavelength.

The principal advantage of the invention is that the surfaces 32 may be easily formed using conventional fabrication techniques. There are basically two alternative approaches. One is to define a pattern of parallel grooves using conventional photolithographic techniques, and to etch away alternate surfaces using a chemical etching or a dry etching process. The other approach is to deposit a film of material over the entire surface of the body. The deposited film should be of a material that matches the acousto-optical material of the body quite closely, and is applied to a thickness corresponding to the desired step height. Then a pattern is defined over the film and portions of the film are etched away to define the desired grooved configuration.

Figure 3:
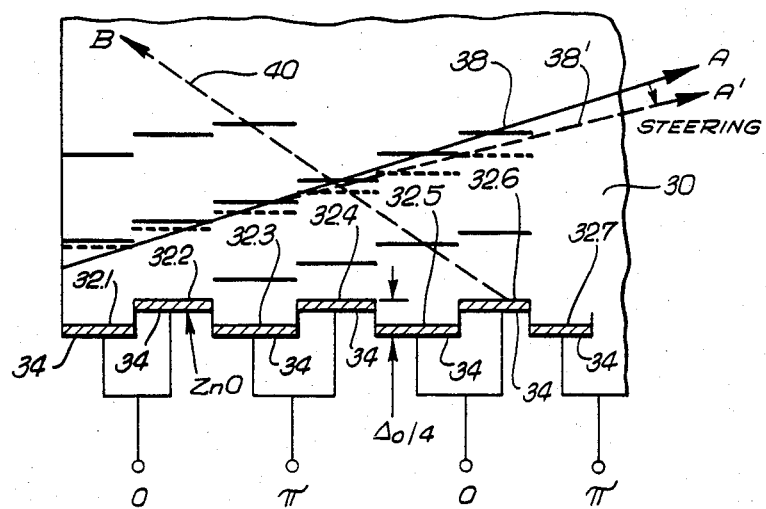
FIG. 3 is a diagrammatic view of an acoustic phased array constructed in accordance with the invention when $\phi = 180°$ and n=2.

As indicated by the alternate wavefront 38' in FIG. 3, the acoustic beam emanating from the array may be steered by varying the acoustic frequency of the rf signal.

The acousto-optical material used in the body 30 may be any of a variety of suitable compounds. For example gallium phosphide (GaP), and lithium niobate (LiNbO3) are materials that have been used in Bragg cells.

It will be appreciated from the foregoing that the present invention represents a significant advance in the field of acousto-optical devices. In particular, the invention provides an acoustic phased array with the manufacturing advantages of a planar array, but with twice the interaction efficiency. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. For use in an acousto-optical device, an acoustical phased array, comprising:

a body of acousto-optical material having one face grooved to form a plurality of sets of plane parallel surfaces having n different height levels, where n is at least two, there being n surfaces in each set, ranging in height from lowest to highest;

a plurality of electro-acoustic transducers affixed one to each of the surfaces; and means for applying a plurality of high-frequency signals to transducers affixed to respective sets of surfaces, each of the signals having the same phase difference with respect to the signal applied to an adjacent set of transducers, and each signal being applied in parallel to all of the transducers in a set;

and in which the incremental height difference between adjacent surfaces in the same set is 1/n of the phase difference between signals applied to adjacent sets, expressed in wavelengths.

2. An acoustical phased array as defined in claim 1, in which:

the phase difference between signals applied to transducers on successive sets of surfaces is 180°; and the incremental height is $\frac{1}{2}n$ of a wavelength.

3. An acoustical phased array as set forth in claim 2, in which:

the number (n) of surface levels is two; and the incremental difference in surface levels is one quarter-wavelength.

4. An acoustical phased array as set forth in claim 3, in which:

the transducers are of zinc oxide.

5. For use in an acousto-optical device, an acoustical phased array, comprising:

a body of acousto-optical material having one face grooved to form a plurality of pairs of plane parallel surfaces having two different height levels;

a plurality of electro-acoustic transducers affixed one to each of the surfaces;

means for applying a plurality of high-frequency signals to transducers affixed to respective sets of surfaces, each of the signals having the same phase difference with respect to the signal applied to an adjacent set of transducers, and each signal being applied in parallel to all of the transducers in a set;

and in which the incremental height difference between adjacent surfaces in the same set is 1/n of the phase difference between signals applied to adjacent sets, expressed in wavelengths.

means for applying a first high-frequency electrical signal in parallel to all of the transducers affixed to a first set of the surfaces;

means for applying a second high-frequency signal in parallel to all of the transducers affixed to a second set of the surfaces, the second signal having a selected phase difference with respect to the first; and means for applying additional high-frequency signals to additional transducers affixed to respective sets of surfaces, each of the signals having the same phase difference with respect to the signal applied to the adjacent set of transducers.

6. An acoustical phased array as defined in claim 5, in which:

the phase difference between signals applied to transducers on successive sets of surfaces is 180°; and the incremental height is $\frac{1}{2}n$ of a wavelength.

7. An acoustical phased array as set forth in claim 6, in which:

the number (n) of surface levels is two; and the incremental difference in surface levels is one quarter-wavelength.

8. An acoustical phased array as set forth in claim 7, in which:

the transducers are of zinc oxide.

* * * * *